United States Patent
Mizuno et al.

(10) Patent No.: US 10,270,756 B2
(45) Date of Patent: Apr. 23, 2019

(54) SERVICE PROVIDING METHOD, AND SERVICE PROVIDING DEVICE

(71) Applicant: FUJITSU LIMITED, Kawasaki-shi, Kanagawa (JP)

(72) Inventors: Shouhei Mizuno, Itabashi (JP); Akio Shimono, Yokohama (JP); Mamoru Yoshimuta, Ota (JP); Naoki Miyoshi, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 332 days.

(21) Appl. No.: 15/244,788

(22) Filed: Aug. 23, 2016

(65) Prior Publication Data
US 2016/0366125 A1  Dec. 15, 2016

Related U.S. Application Data

(63) Continuation of application No. PCT/JP2014/054266, filed on Feb. 24, 2014.

(51) Int. Cl.
*H04L 29/06* (2006.01)
*G06F 21/33* (2013.01)
*H04W 12/06* (2009.01)

(52) U.S. Cl.
CPC .......... *H04L 63/0823* (2013.01); *G06F 21/33* (2013.01); *H04L 63/0815* (2013.01); *H04L 63/0876* (2013.01); *H04W 12/06* (2013.01)

(58) Field of Classification Search
CPC .. H04L 63/0823; H04L 63/0815; G06F 21/33
(Continued)

(56) References Cited

U.S. PATENT DOCUMENTS 9,203,828 B2 * 12/2015 Shimono ................. G06F 21/41
2006/0015933 A1 * 1/2006 Ballinger ............. G06F 21/335
726/10

(Continued)

FOREIGN PATENT DOCUMENTS

JP  2006-99406    4/2006
JP  2013-182375   9/2013
(Continued)

OTHER PUBLICATIONS

International Search Report dated Nov. 18, 2014 in corresponding International Application No. PCT/JP2014/054266**.

*Primary Examiner* — Teshome Hailu
(74) *Attorney, Agent, or Firm* — Staas & Halsey LLP

(57) ABSTRACT

A service providing method, the method comprises transmitting, by a first information processing device, a certification token including a first role information on a service provided by the first information processing device to a terminal device when a certification is successful in response to a certification demand from the terminal device, receiving, by the first information processing device, the certification token and a first address information, that identifies a service providing device and indicates the first information processing device, from the terminal device, and transmitting, by the first information processing device, a first token including the first role information indicated by the certification token which is received and a second address information, that identifies the service providing device and indicates a second information processing device, to the second information processing device which is either one of the service providing device or a way device to the service providing device.

13 Claims, 13 Drawing Sheets

(58) Field of Classification Search
USPC .............................................................. 726/7
See application file for complete search history.

(56) References Cited

U.S. PATENT DOCUMENTS

| | | |
|---|---|---|
| 2006/0080370 A1 | 4/2006 | Torii et al. |
| 2007/0226785 A1* | 9/2007 | Chow ..................... H04L 63/08 |
| | | 726/8 |
| 2010/0187302 A1* | 7/2010 | Sermersheim .......... G06F 21/33 |
| | | 235/380 |
| 2010/0212004 A1* | 8/2010 | Fu ........................ G06F 21/6218 |
| | | 726/9 |
| 2011/0167256 A1* | 7/2011 | Lee ....................... H04L 63/104 |
| | | 713/156 |
| 2012/0084869 A1* | 4/2012 | Bilaney ................. G06F 21/335 |
| | | 726/27 |
| 2013/0232546 A1 | 9/2013 | Shimono |
| 2013/0232557 A1 | 9/2013 | Shimono |
| 2013/0304762 A1 | 11/2013 | Shimono |

FOREIGN PATENT DOCUMENTS

| | | |
|---|---|---|
| JP | 2013-182460 | 9/2013 |
| WO | 2012/077223 A1 | 6/2012 |

\* cited by examiner

SERVICE PROVIDING METHOD, AND SERVICE PROVIDING DEVICE

CROSS-REFERENCE TO RELATED APPLICATION

This application is a continuation application of International Application PCT/JP2014/054266 filed on Feb. 24, 2014 and designated the U.S., the entire contents of which are incorporated herein by reference.

FIELD

The embodiments discussed herein are related to a service providing method, and a service providing device.

BACKGROUND

SaaS (Software as a Service) is service to provide a function of software such as an application to a user. It is possible to integrate data of various applications that an individual and a corporation utilize by providing the use service in the user data storage unit to the service on the SaaS. In addition, there is a case that a plurality of services on SasS cooperate each other (referring to patent document 1, for example). It is possible to provide a higher service by cooperating with the plurality of services.

The cooperation between the plurality of services is realized by Web API (Application Program Interface) which a service provider disclosed, for example. The application developer develops the application software in combination with Web API or API that other service provider provides. The access for Web API is performed based on certification protocols such as OAuth 2.0 or SAML (Security Assertion Markup Language) 2.0, for example.

In addition, information and communication technology includes an access control technology based on the role. The access control based on the role gives the user who succeeded in the certification the role and gives permission (access permission) depending on the role as a method of the access control for the resource, for example. Especially, the server publishes information (below called as certification token) which proves that the user has a right to use the service to a terminal when the user succeeds in the certification. And the terminal adds a published certification token to a request and transmits the request to the server, thereby it is possible to receive the provision of the service with the server within the role.

For example, it is exemplified that a service "A" cooperates with a service "B". In addition, a user X has an account in the service "A", but has not an account in the service "B". When the service "B" is cooperation to the service "A", the user X is able to receive the provision of service "B" that the user X does not have the account based on a certification token published by the service "A". At first the terminal gives the certification token published by the service "A" to an issue request of the certification token and transmits to a provision server of the service "B". The provision server of the service "B" publishes the certification token including the role on the service "B" corresponding to the role included in the certification token for the service "A" to the terminal. And the terminal gives the certification token that the service "B" published to the provision request of the service "B" and transmits the provision request to the provision server of service "B". By this method, it is possible to receive the provision of the service within the role on the service "B".

In addition, when there is service "C" in connection with the service "B", it is possible that the user receives an provision of service "C" based on the certification token published by the service "B". In this way, by receiving the certification on one service (in this example service "A"), the user is able to receive the provision of the different service (in this example service "B", service "C") to cooperate like a chain reaction.

CITATION LIST

Patent Document

[Patent document 1] Japanese Laid-Open Patent Publication No. 2013-182460

SUMMARY

However, when the terminal receives the provision of the service C based on the certification token of service "A", it needs to acquire each certification token that the services "A"-"C" publish. Therefore, a lot of communication occurs between the terminal and each server providing the services "A"-"C". As the way services between a certification server and the provision server of the objective service increase, the communication number of times between the terminal and the server increases.

For example, the terminal is connected to the network through a wireless line. Therefore, because a large number of communications occurs between the terminal and each server, the time until receiving the provision of the service that the terminal is finally aimed for gets longer, thereby the utility of the service is spoiled.

According to an aspect of the embodiments, a service providing method, the method comprises transmitting, by a first information processing device, a certification token including a first role information on a service provided by the first information processing device to a terminal device when a certification is successful in response to a certification demand from the terminal device, receiving, by the first information processing device, the certification token and a first address information, that identifies a service providing device which provides a service requested by the terminal and indicates the first information processing device, from the terminal device, and transmitting, by the first information processing device, a first token including the first role information indicated by the certification token which is received and a second address information, that identifies the service providing device and indicates a second information processing device, to the second information processing device which is either one of the service providing device or a way device to the service providing device that is identified based on the first address information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram indicating the propagation example of the certification token when adopting Single Sign-On.

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Service Provision System]

Figure 1:
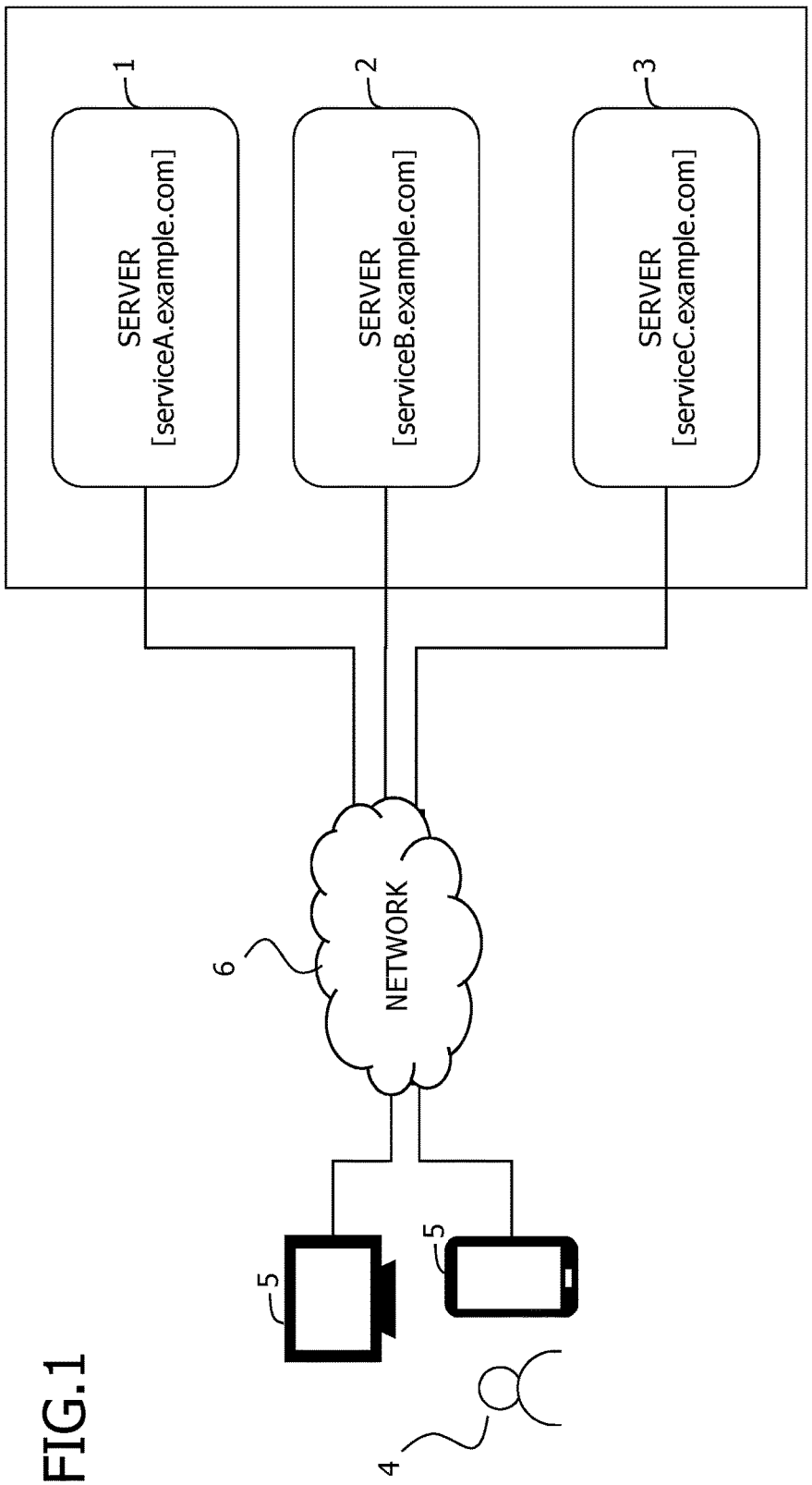
FIG. 1 is a diagram indicating an example of the constitution of the service provision system according to the embodiment.

FIG. 1 is a diagram indicating an example of the constitution of the service provision system according to the embodiment. In an example of FIG. 1, a terminal 5 that a user 4 uses connects with a plurality of servers 1-3 through network 6. For example, the terminal 5 in the embodiment is a smart phone or a note PC, etc. The terminal 5 is connected to the network 6 through a wireless line. In contrast, the servers 1-3 are connected to the network through a high-speed Internet line.

Each of the servers 1-3 provides each of the services "A"-"C" depending on a demand or a request from the terminal 5. In an example of FIG. 1, the servers 1-3 are a Web server. For example, the server 1 provides a function of the Web Service which is appointed by URL (Uniform Resource Locator) "service A.example.com". Similarly, the server 2 provides a function of the Web Service which is appointed by the URL "service B.example.com", and, the server 3 provides a function of the Web Service which is appointed by the URL "service C.example.com".

In addition, each of servers 1-3 depicted in FIG. 1 has the user certification function based on the account information registered beforehand each. In addition, each of servers 1-3 publishes the certification token indicating that the user who succeeded in the user certification has a right to use the service that an own server provides. In addition, the certification token has the role information indicating the role to define the provision range of the service. Therefore, it is possible that the terminal 5 receives the provision of the service based on the certification token published by the servers 1-3 within a range corresponding to the role information in the certification token.

[Cooperation of Service]

Figure 2:
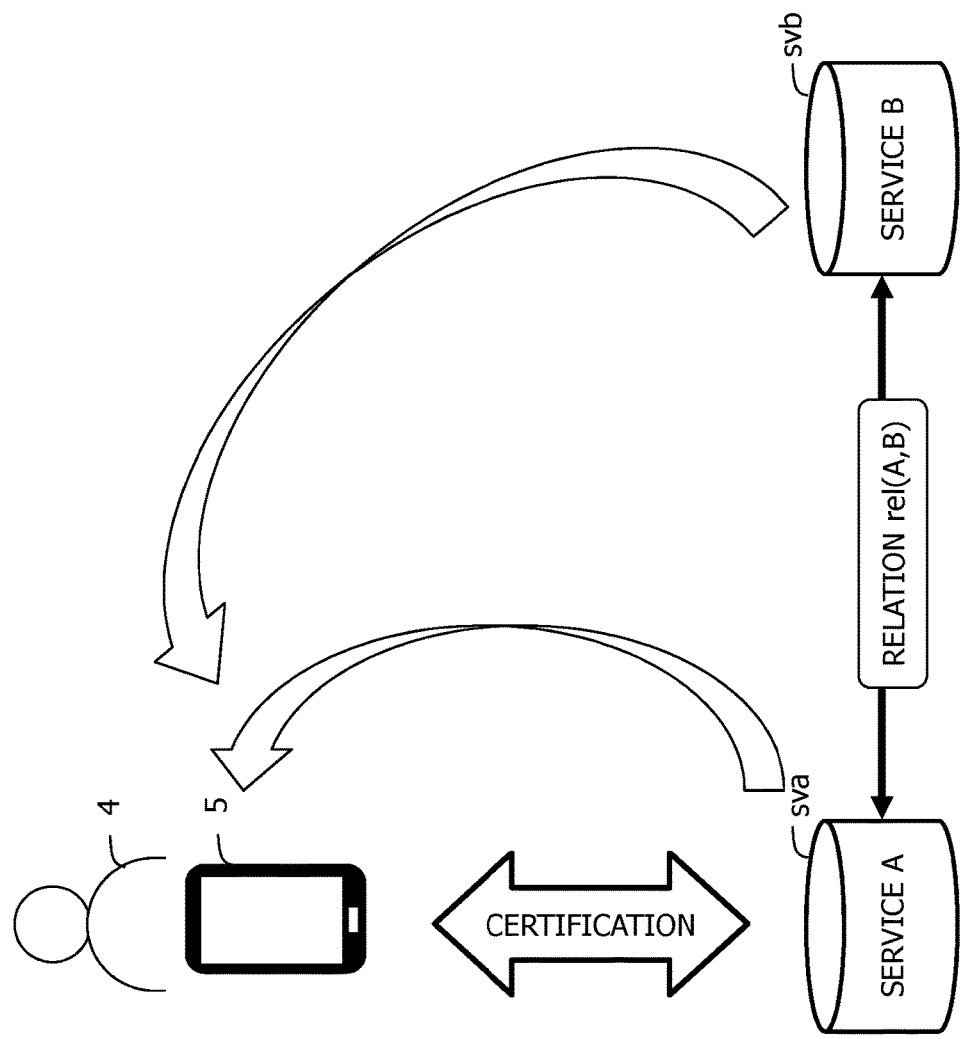
FIG. 2 is a diagram explaining the cooperation of the service.

FIG. 2 is a diagram explaining the cooperation of the service. In FIG. 2, a case that the service "Asvb" cooperates with the service "Bsva" is exemplified. The cooperation of the service is realized by incorporating the Web API (Application Program Interface) of the different service with one service, for example. Certification protocols such as OAuth are used, for example, for the access for the Web API.

In an example of FIG. 2, the service provider to provide the service "Asva" has a relationship of mutual trust with the service provider to provide the service "Bsvb", and, the relation based on the relationship of mutual trust are defined in the provision server of the service. For example, in the example of FIG. 2, the relation "rel (A, B)" with the service "Asva" and the service "Bsvb" is defined.

As described above, each of the service registers the account information (for example, a user ID and a password) of the user that the service manages. Each of services performs the certification processing of the user based on the registered account information. In an example of FIG. 2, the user 4 has account information in the service "Asva" and does not have account information in the service "Bsvb". When the user 4 succeeds in the certification on the service "Asva", the user receives the issue of certification token having the role information indicating the role on the service "Asva". The user 4 is permitted to receive a provision of service "Asva" based on the certification token.

Furthermore, when the user 4 receives a provision of the service "Bsvb" in connection with the service "Asva", the terminal 5 notifies the published certification token from the service "Asva" to the service "Bsvb". Then the terminal 5 receives the publication of the certification token which has a role on the service "Bsvb" corresponding to the role on the service "Asva" from the service "Bsvb". The service "Bsvb" acquires a role on the service "Bsvb" based on the combination of the relation "rel (A,B)" and role on the service "Asva" of the user 4.

Here, a case that the parent company of the service provider of the service "Asva" manages the service "Bsvb" is exemplified. For example, when a role on the service "Asva" of the user 4 is "an employee", the role on the service "Bsvb" corresponding to the role "employee" on the service "Asva" is set to "the employee of the subsidiary". User 4 can receive the service that service "Bsvb" provides within the authority that a role on service "Bsvb" is set depending on "the employee of the subsidiary".

And the user 4 is permitted to receive an provision of the service "Bsvb" within the role that the published certification token has from the service "Bsvb". Therefore, the user 4 does not perform the user certification on the service "Bsvb".

In this way, when the plurality of services cooperate, the user 4 is permitted to receive the provision of the service depending on the role of user 4 on the service "Asva" having the account information from the service "Bsvb" which does not have an account information of the user 4. Therefore, it is possible that the service "Bsvb" provides the service in the appropriate range in the user 4 without managing the account information of the user 4.

Next, an example of the services in three hierarchies which cooperate to each other will be described. In the embodiment, a mutual aid project service "sv1", a mutual aid project service of each prefecture ("A" prefecture mutual aid project service "sv11", "B" prefecture mutual aid project service "sv12"), and a mutual aid project service of each, town and village in each prefecture ("A" prefecture "W" city mutual aid project service "sv21", "A" prefecture "X" city mutual aid project service "sv22", "B" prefecture "Y" city mutual aid project service "sv23", and "B" prefecture "Z" city mutual aid project service "sv24") are exemplified. For example, the mutual aid project service "sv1" corresponds to the service "A" in FIG. 1 and FIG. 2, and "A" prefecture mutual aid project service "sv11" corresponds to the service "B" in FIG. 1 and FIG. 2, and "A" prefecture "W" city mutual aid project service "sv21" corresponds to the service "C" in FIG. 1 and FIG. 2.

Figure 3:
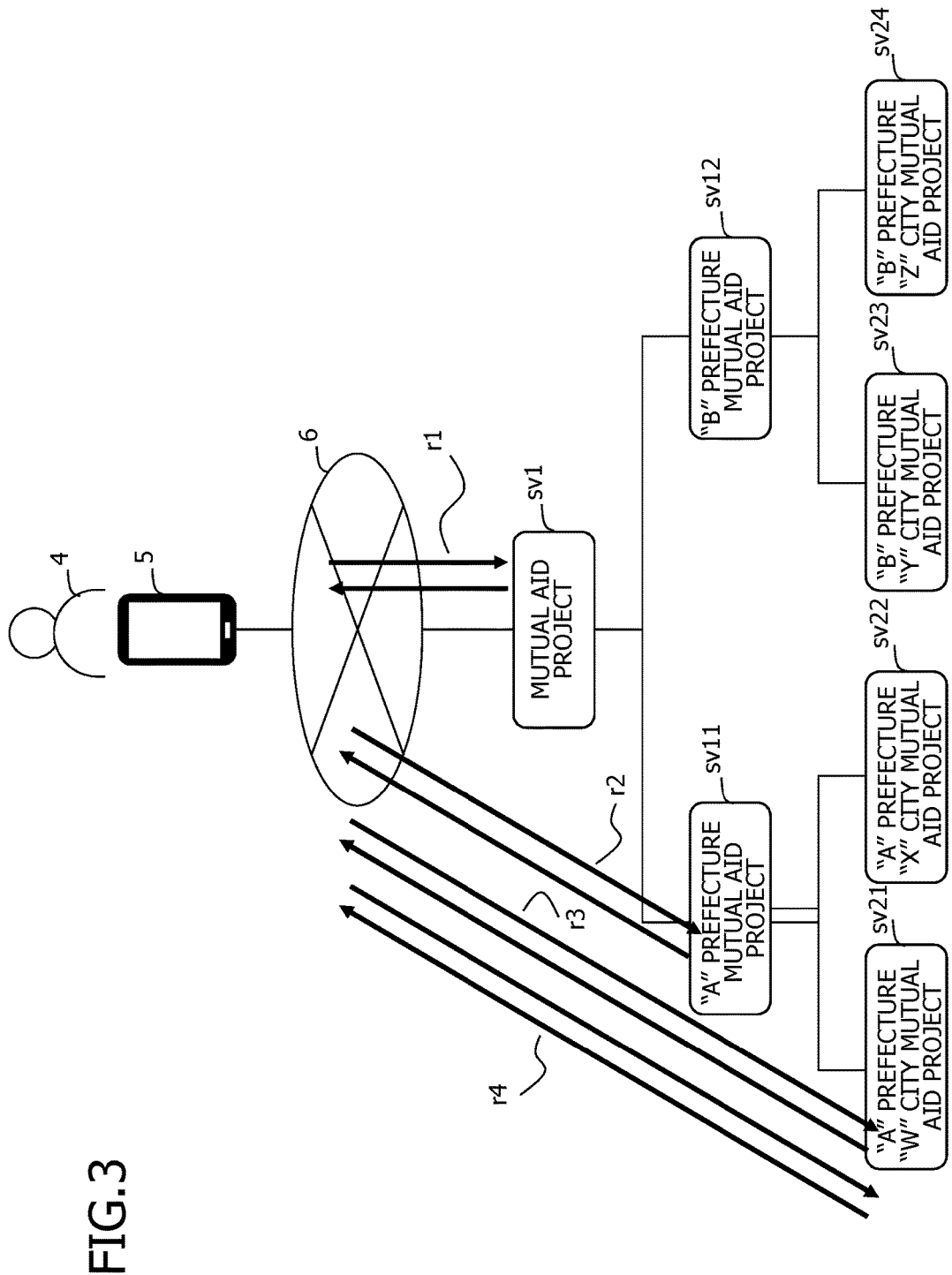
FIG. 3 is a diagram explaining an example of the cooperating services of three hierarchies.

FIG. 3 is a diagram explaining an example of the cooperating services of three hierarchies. In an example of FIG. 3, the mutual aid project service "sv1" cooperates with the mutual aid project service of each prefecture ("A" prefecture mutual aid project service "sv11", "B" prefecture mutual aid project service "sv12"). In addition, the mutual aid project service "sv11" of "A" prefecture cooperates with the mutual aid project services of each cities, towns and villages in the "A" prefecture ("A" prefecture "W" city mutual aid project service "sv21", "A" prefecture "X" city mutual aid project service "sv22"). Similarly, the mutual aid project service "sv12" of "B" prefecture cooperates with the mutual aid project services of each cities, towns and villages in the "B" prefecture ("B" prefecture "W" city mutual aid project service "sv23", "B" prefecture "X" city mutual aid project service "sv24"). But the mutual aid project service "sv1" does not directly cooperate with the mutual aid project services "sv21"-"sv24" of each cities, towns and villages in each prefecture.

Under a situation that the cooperation relations of the services is set like FIG. 3, it is exemplified that the user 4 having an account information in the mutual aid project service "sv1" gets the service of "A" prefecture "W" city mutual aid project service "sv21". In this example, the user 4 does not have an account information for the service except the mutual aid project service "sv1". Therefore, the user 4 gets an provision of the mutual aid project service "sv21" of the "A" prefecture "W" city based on a certification token published by the mutual aid project service "sv1" via the "A" prefecture mutual aid project service "sv11".

The user 4 gets the certification from the mutual aid project service "sv1" and obtains the publication of the certification token tk1 from the mutual aid project service "sv1" (r1). Successively the user 4 obtains the publication of certification token tk11 for "A" prefecture mutual aid project service "sv11" from the mutual aid project service "sv11" of the "A" prefecture based on the certification token tk1 for the mutual aid project service "sv1" (r2). And the user 4 obtains the publication of certification token tk21 for "A" prefecture "W" city mutual aid project service "sv21" from the mutual aid project service "sv21" of the "A" prefecture "W" city based on the certification token tk11 for the mutual aid project service of "A" prefecture "sv11" (r3). And the user 4 gets a provision of "A" prefecture "W" city mutual aid project service "sv21" within the role that the certification token includes based on the certification token tk21 for the "A" prefecture "W" city mutual aid project service "sv21" (r4).

[Sequence Diagram]

Figure 4:
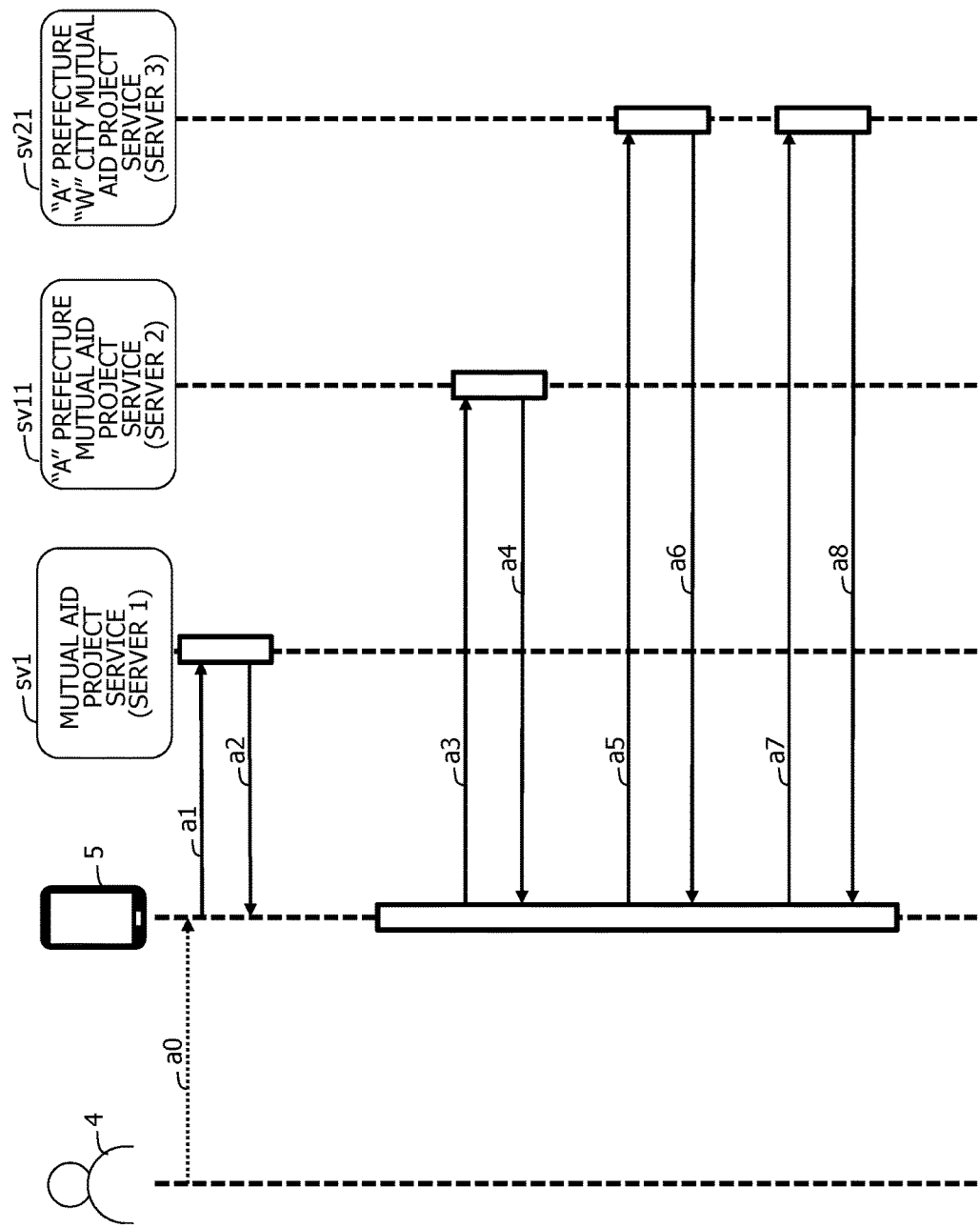
FIG. 4 is a diagram of sequence indicating an example of the flow of the communication processing when using the service to cooperate depicted in FIG. 3.

FIG. 4 is a diagram of sequence indicating an example of the flow of the communication processing when using the service to cooperate depicted in FIG. 3. FIG. 4 is a sequence diagram when the user 4 having a account information in the mutual aid project service "sv1" gets the service of "A" prefecture "W" city mutual aid project service sv21, as similar to the example explained in FIG. 3.

At first, the user 4 performs login operation to log in to the mutual aid project service "sv1". For example, the user 4 inputs a account information including a user ID and a password into the terminal 5. The terminal 5 transmits the account information to server 1 in response to the login operation by the user 4.

The server 1 performs the certification processing of the user based on the account information sent by the terminal 5. Especially, the server 1 compares account information registered beforehand with the account information which is received from the terminal 5, and authenticates that the user 4 is a fair user when there is the account information to match with. When the server 1 authenticates that the user 4 is a fair user, the server 1 transmits the certification token tk1 having the role information indicating the role of user the 4 on the mutual aid project service "sv1" to the terminal 5 (a2). The terminal 5 acquires the certification token tk1 published by the server 1 and displays a result of the certification processing.

Successively, the user 4 acquires the certification token tk11 of the "A" prefecture mutual aid project service "sv11" using the certification token tk1 which is published by the mutual aid project service "sv1". Especially, the terminal 5 transmits a publication demand of the certification token tk11 of "A" prefecture mutual aid project service "sv11" to the server 2 which provides "A" prefecture mutual aid project service "sv11" (a3). For example, the terminal 5 adds the certification token tk1 published by the mutual aid project service "sv1" to the publication demand of the certification token tk11 of the "A" prefecture mutual aid project service "sv11" and transmits it to the server 2. When the server 2 receives the publication demand of the certification token tk11, the server 2 acquires role information on the "A" prefecture mutual aid project service sv11 corresponding to the role information that the certification token tk1 of the mutual aid project service "sv1" has. And the server 2 publishes the certification token tk11 having role information on the "A" prefecture mutual aid project service "sv11" to the terminal 5.

Successively, the user 4 acquires the certification token tk21 of "A" prefecture "W" city mutual aid project service "sv21" using the certification token tk11 that the "A" prefecture mutual aid project service "sv11" published. Especially, the terminal 5 transmits the publication demand of the certification token tk21 of the "A" prefecture "W" city mutual aid project service "sv21" to the server 3 which provides the "A" prefecture "W" city mutual aid project service "sv21" (a5). For example, the terminal 5 adds the certification token tk11, which is published from the "A" prefecture mutual aid project service "sv11", to the publication demand of the certification token tk21 of the "A" prefecture "W" city mutual aid project service "sv21" and sends it to the server 3.

When the server 3 receives the publication demand of the certification token tk21, the server 3 acquires the role information on the "A" prefecture "W" city mutual aid project service sv21 corresponding to the role information which is included in the certification token tk11 of the "A" prefecture mutual aid project service "sv11". And the server 3 publishes the certification token tk21 having the role information on the "A" prefecture "W" city mutual aid project service "sv21" to the terminal 5 (a6). And the terminal 5 receives an provision of the "A" prefecture "W" city mutual aid project service "sv21" within the authority which is permitted depending on the role information included in the certification token tk21, based on the published certification token tk21 from the "A" prefecture "W" city mutual aid project service "sv21" (a7, a8).

However, according to the example of FIG. 3 and FIG. 4, six time communication (in the example of FIG. 4 a3-a8) occurs between terminal 5 and each server 1-3 in order that the user 4 receives an provision of the "A" prefecture "W" city mutual aid project service "sv21". As mentioned above, the terminal 5 connects to the network through a wireless line, for example, and connects with the server 1-3. Generally, the transmission rate of the wireless line is slower than a high-speed Internet line. Therefore, the needed time until the user 4 receives the provision of the service which is targeted (in this example, the "A" prefecture "W" city mutual aid project service sv21) gets longer by the communication number of times of the terminal 5 and the servers 1-3 increasing. Thereby the utility of the service is spoiled.

In addition, in the example of FIG. 3 and FIG. 4, it is exemplified that three services cooperate in maximum. However, when more services cooperate, in other words, when the hierarchies from the service (in this example, the mutual aid project service "sv1") that received the certification to the objective service (in this example, the "A" prefecture "W" city mutual aid project service "sv21") become deep, the communication number of times increases, and the time needed until the user 4 receives the provision of the service which is targeted gets longer more. Therefore, it is desirable that the communication between the terminal 5 and each servers 1-3 is held by the minimum number of times.

Therefore, according to the service provision(providing) method in the embodiment, the first server, which transmitted the certification token to the terminal 5, receives the certification token and the first address information, which is able to identify a service provision(providing) server providing the service that the terminal 5 requests and indicates the first server, from the terminal 5. And, the first server transmits a letter of introduction token including the first role information and second address information, which is able to identify the service provision server and indicates the second server, to one of a service provision server identified based on the first address information and a way server to the service provision server.

In addition, the second server receives the letter of introduction token, which includes the first role information on the service provided by the first server, and the second address information, which is able to identify the service provision server which provides the service requested by the terminal 5 and indicates the second server. And the second server provides the service corresponding to the second address information to terminal 5, based on the first role information included in the letter of introduction token, when a service provision server identified based on the second address information is an own server.

In other words, according to the service provision method of the embodiment, in an example of FIG. 4, when the server 1 of the mutual aid project service "sv1" receives an provision demand of the "A" prefecture mutual aid project service "sv11" which is added the certification token tk1, the server 1 publishes a letter of introduction token and transmits the provision demand, which includes the address information indicating the provision server 2 of the "A" prefecture mutual aid project service "sv11" and a letter of introduction token, to the server 2 of the "A" prefecture mutual aid project service "sv11". In addition, when the server 2 receives the provision demand of the service of the "A" prefecture mutual aid project service "sv11", the server 2 provides the service to the terminal 5 based on the letter of introduction token.

Then the constitution of server 1-3 in the service provision system of the embodiment will be described. In addition, FIG. 5 illustrates a constitution example of server 1, but, other servers 2, 3 and the terminal 5 depicted in FIG. 1 has a similar construction.

[Constitution of the Server]

Figure 5:
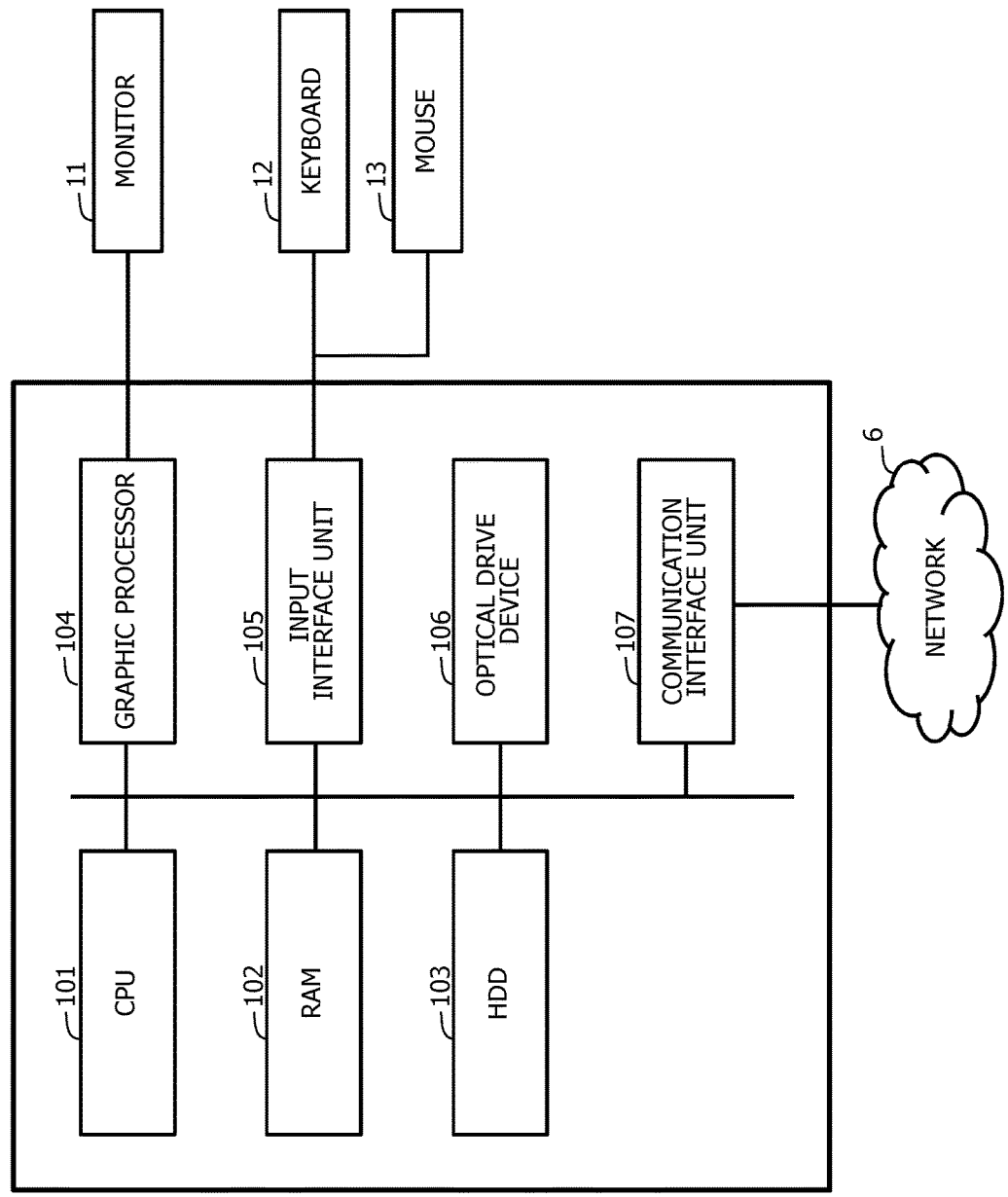
FIG. 5 is a diagram explaining constitution of server 1 in the embodiment.

FIG. 5 is a diagram explaining constitution of server 1 in the embodiment. The server 1 depicted in FIG. 5 has a CPU (Central Processing Unit) 101, a RAM (Random Access Memory) 102, a storage medium such as HDD 103, a graphic processor 104, an input interface unit 105, an optical drive device 106, and a communication interface unit 107. The all parts are connected through a bus 108 mutually.

The CPU 101 connects with the RAM 102 and plural peripheral devices through the bus 108 and controls the whole server 1. The RAM 102 is used as main memory of the server 1. The RAM 102 memorizes the program of OS (Operating System) and the service provision program PR according to the embodiment that the CPU 101 carries out. The service provision program PR realizes the service provision processing in the embodiment by collaborating with the CPU 101.

The HDD 103 performs the writing and reading of data for the disk which is incorporated magnetically. The HDD 103 is used as auxiliary memory of the server 1. The HDD 103 memorizes a program of the OS, the application program and various data.

The graphic processor 104 is connected to a monitor 11. The graphic processor 104 displays an image to a screen of the monitor 11 according to an order from the CPU 101. The monitor 11 is a display unit using the CRT (Cathode Ray Tube) or a liquid crystal display device. The input interface unit 105 connects with a keyboard 12 and a mouse 13. The input interface unit 105 transmits a signal to receive from the keyboard 12 and the mouse 13 to the CPU 101.

The Optical drive device 106 performs the reading of data recorded to the optical disk 14 using laser beams. The optical disk 14 is a recording medium of movable where the data were recorded to be readable by a reflection of the light. The optical disk 14 is a DVD (Digital Versatile Disc), a DVD-RAM, a CD-ROM (Compact Disc Read Only Memory), a CD-R (Recordable)/CD-RW (ReWritable). The communication interface unit 107 transmits and receives data between communication equipment of other servers 2, 3 or the terminal etc. through the network 6.

[Block Diagram of the Server]

Figure 6:
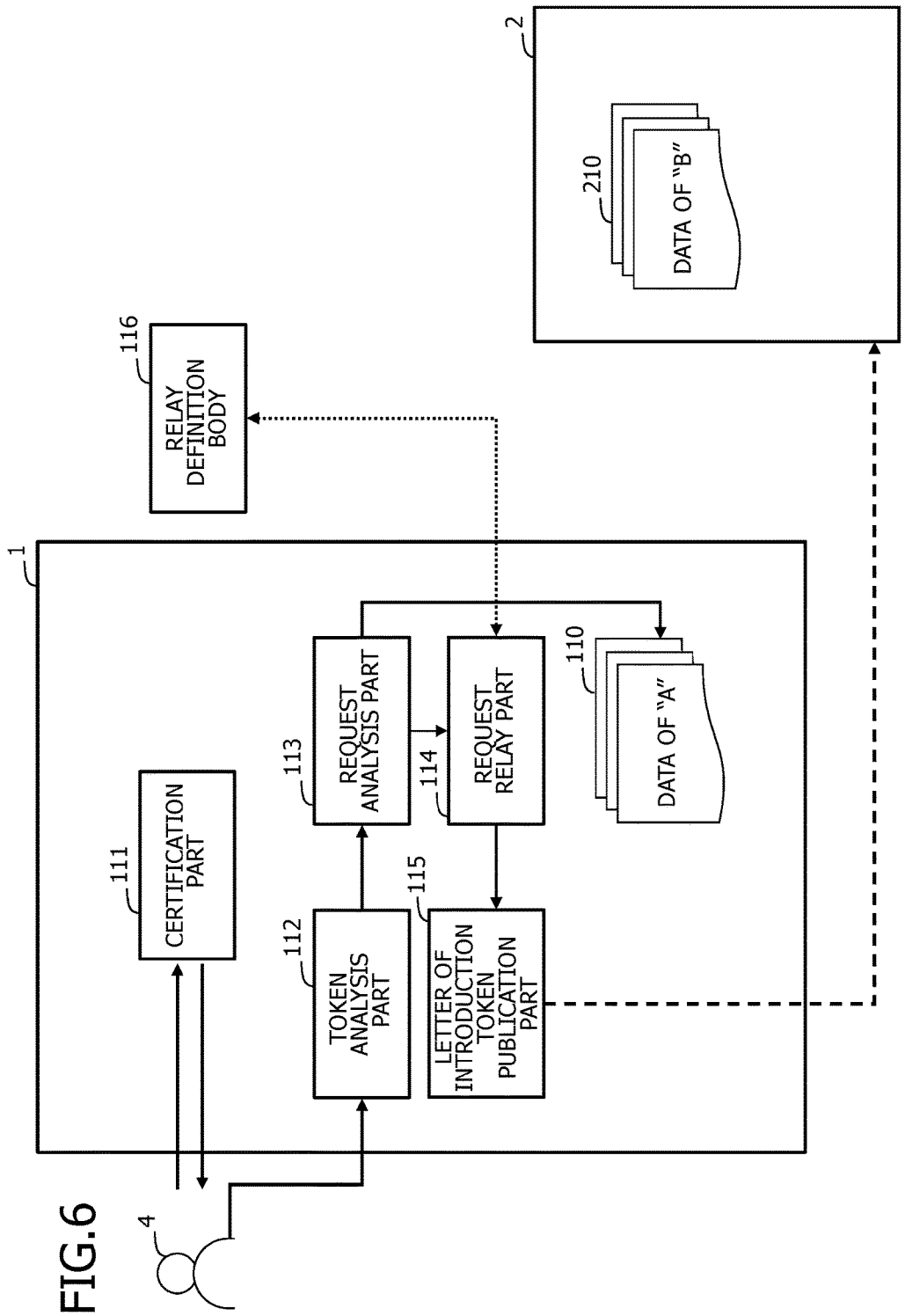
FIG. 6 is a diagram indicating an example of the block diagram of server 1 in the embodiment.

FIG. 6 is a diagram indicating an example of the block diagram of server 1 in the embodiment. The server 1 of FIG. 6 has a certification part 111, a token analysis part 112, a request analysis part 113, a request relay part 114, a letter of introduction token publication part 115, and a data folder 110, for example. In addition, the request analysis part 113 is accessible to a relay definition body 116. The relay definition body 116 may be memorized in the storage medium 103 of the server 1 and may be memorized in accessible different storage medium. In addition, the data folder 110 stores the application data of the user, for example.

The certification part 111 performs the user certification based on an account information (a user ID and password) sent by the terminal 5 depending on a certification demand from the terminal 5. For example, the certification part 111 performs the authentication it by judging whether the account information added to the certification demand matches with the account information of the user registered beforehand. When the certification is successful, the certification part 111 publishes a certification token including the role information indicating the role of the user in the server 1.

The token analysis part 112 analyzes the token which is received. For example, the token analysis part 112 inspects the legitimacy of the token based on the electronic-signature that the token has and judges the classification of the token which is received. In addition, the token analysis part 112 acquires the role information indicating the role in the service of the origin of publication of the token. In addition, the request analysis part 113 judges whether the provision server of the objective service identified by the address information is own server 1, based on the address information that is received from the terminal 5. For example, the address information is a URL (Uniform Resource Locator). When the provision server of the objective service is own server 1, the request analysis part 113 accesses data in the data folder 110 of the server 1 corresponding to the address information and provides the service within the role that the certification token has to the terminal 5. On the other hand, when the provision server of the objective service is a server except own server 1, the request analysis part 113 asks a publication of letter of introduction token, based on the token which is received, to the letter of introduction token publication part 115.

In addition, the request analysis part 113 acquires transmission destination of the letter of introduction token. When the service that own server 1 provides cooperates with the objective service directly, the transmission destination of the letter of introduction token (that is, relay destination) becomes the provision server of the service. On the other hand, when the service that own server 1 provides does not cooperate with the objective service directly, the transmission destination of the letter of introduction token is the provision server of the relay service between provision service of own server 1 and the objective service. For example, the request analysis part 113 acquires way service based on the address information and the relay definition body 116. The relay definition body 116 has the information of the relay services from the provision service of own server 1 to the objective service corresponding to the cooperation relations between services, for example.

When the letter of introduction token publication part 115 receives an issue request of letter of introduction token, the letter of introduction token publication part 115 produces a letter of introduction token. The details of the letter of introduction token will be mentioned later in FIG. 7. And the letter of introduction token publication part 115 adds a letter of introduction token to the address information which is revised matching to the transmission destination of the letter of introduction token decided by the request analysis part 113, and sends it to a server (in the example of FIG. 6, server 2) of transmission destination.

In addition, the other servers 2, 3 have a constitution like the server 1. However, in the embodiment, all servers 1-3 need not have the certification function. The server which does not include the certification function does not need to have the certification part 111. In addition, in FIG. 6, the server 2 has the data folder 210 which store the application data of the user.

[Letter of Introduction Token]

Figure 7:
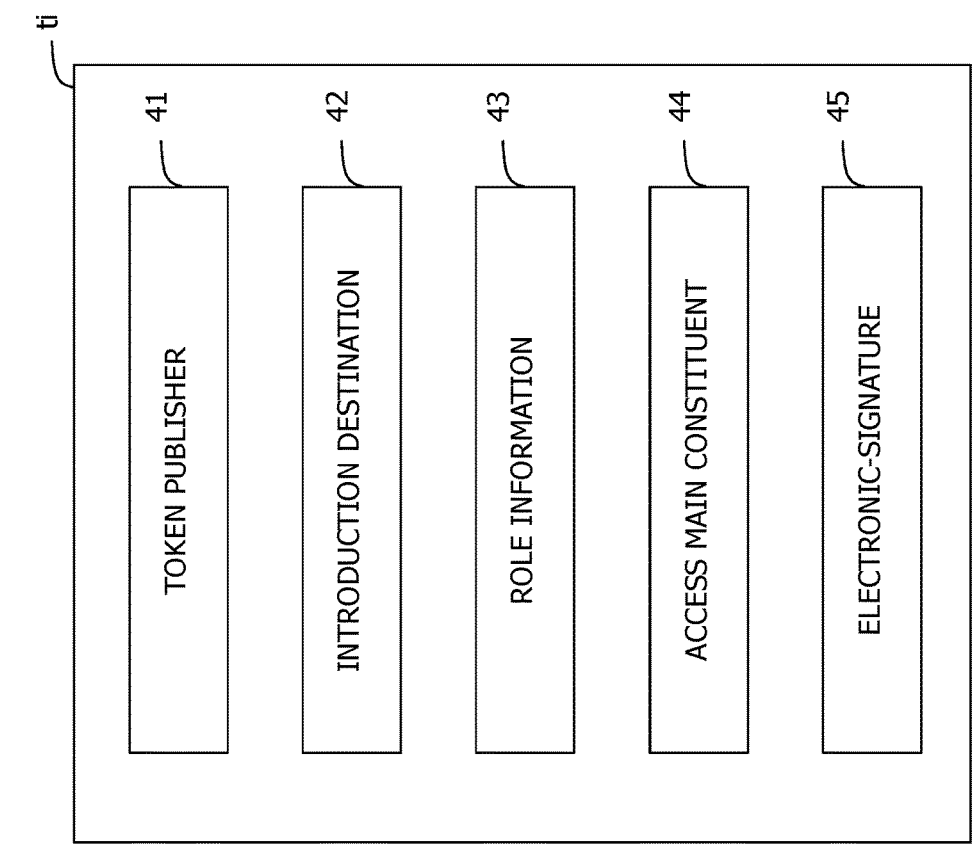
FIG. 7 is a diagram indicating an example of the information that the letter of introduction token "ti" has.

FIG. 7 is a diagram indicating an example of the information that the letter of introduction token "ti" has. For example, the letter of introduction token "ti" includes a token publisher 41, an introduction destination 42 of letter of introduction token "ti", a role information 43 that the token publisher authorizes, an access main constituent 44 and electronic-signature 45.

The token publisher 41 is an identifier of the services which publishes a letter of introduction token. For example, the identifier of the server depicts the URL of the server. The introduction destination 42 of the letter of introduction token is an identifier of the services which receives the letter of introduction token "ti". Similarly, for example, the identifier of the server depicts the URL of the server. In addition, the role information 43 that a letter of introduction token publisher permits indicates the role that the service which is the publisher of the letter of introduction token authorizes according to a user. The access main constituent 44 is an identifier of the users accessing it. For example, the identifier of the user is a user ID. The electronic-signature 45 is the information that a publisher of letter of introduction token "ti" grants to guarantee legitimacy of letter of introduction token "ti".

The processing of the server 1-3 and the terminal 5 in the embodiment will be described based on a flow chart successively.

[Flow Chart: A Terminal]

Figure 8:
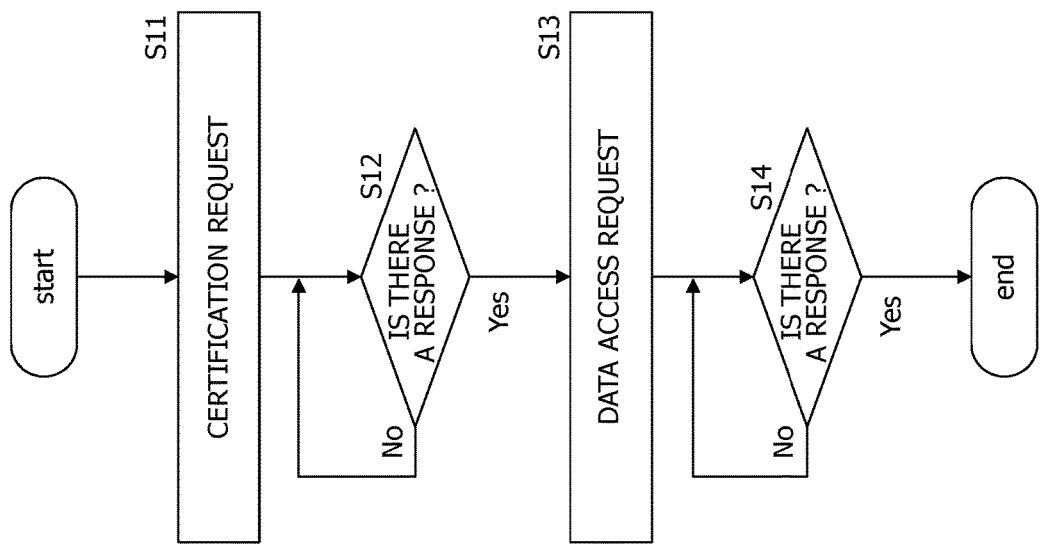
FIG. 8 is a diagram of flow chart explaining processing of the terminal 5 in the embodiment.

FIG. 8 is a diagram of flow chart explaining processing of the terminal 5 in the embodiment. The terminal 5 transmits a certification demand to log in to service to the server having an account of the user 4 (S11). The terminal 5 sends the account information to the server 1. The terminal 5 waits by a reply of the server 1 to transmission of the account information (S12). When the user certification is successful, the terminal 5 receives the published certification token tk1 from the service that the server 1 provides.

Successively, the terminal 5 transmits the provision demand of the service such as data access to the provision server of the service which published the certification token tk1 (S13). The terminal 5 may transmit the provision demand of the publication origin service of the certification token tk1 and may transmit the provision demand of different service from the publication origin service of the certification token tk1. The terminal 5 adds the certification token tk1 which is received to the address information indicating the provision demand (such as data access demand) of the service and transmits it to the server of the publication origin of the certification token tk1. The address information is, for example, a URL and includes the information which identifies the objective service. Then, the terminal 5 waits by the reply corresponding to the provision demand of the service (S14).

[Flow Chart: A Server]

Figure 9:
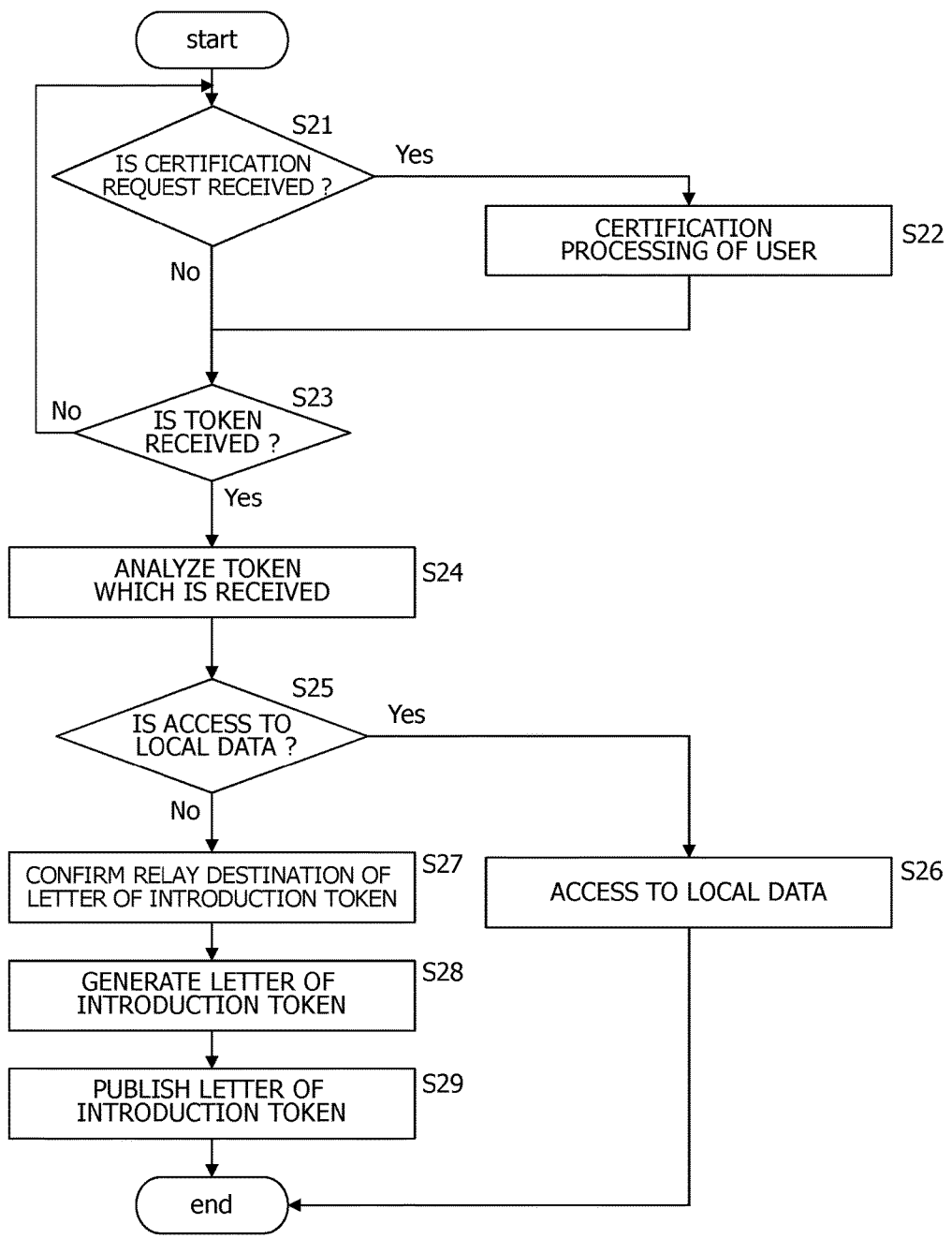
FIG. 9 is diagram an example of the flow chart explaining processing of the server 1 in the embodiment.

FIG. 9 is diagram an example of the flow chart explaining processing of the server 1 in the embodiment. In addition, other servers 2, 3 have a process like the server 1.

The server 1 waits by the reception of the certification demand or the provision demand of the service. When the server 1 receives the certification demand (S21), the certification part 111 in the server 1 performs the certification processing of the user based on the account information of the user which is added the certification demand (S22). The certification part 111 compares the account information sent by the terminal 5 with the account information registered beforehand and authenticates that the user is a fair user when the account information sent by the terminal 5 matches with the account information registered beforehand. The certification part 111 publishes the certification token tk1, which includes the role information indicating the role in the service that the server 1 provides, to the terminal 5 when the certification is successful.

In addition, when the server 1 receives the provision demand of the service (YES of S23), the token analysis part 112 in the server 1 performs analysis processing of the token which is received (S24). The token analysis part 112 judges the legitimacy of the token based on the electronic-signature included in the token and judges the classification of the token. When the token which is received is the letter of introduction token "ti", the token analysis part 112 acquires the role in the service that own server 1 provides, based on the role information 43 that the token publisher authorizes in the token "ti".

Successively, the request analysis part 113 in the server 1 identifies provision server 1 of the objective service that the terminal 5 requires based on address information sent with the token, and judges whether or not own server 1 corresponds to the provision server 1 of the objective service (S25). When own server 1 corresponds to the provision server of the service (YES of S25), the server 1 accesses the local data corresponding to the provision demand of the service and provides the data within the role in the service to the terminal 5.

On the other hand, when own server 1 does not correspond to the provision server of the service (NO of S25), the server 1 generates the letter of introduction token "ti" and transmits it to the server 1 which provides the objective service or to the server 1 which provides service to cooperate with provision service of server 1 and provides a way service until the objective service. Therefore, the request relay part 114 in the server 1 identifies a server of the transmission destination (relay destination) of the letter of introduction token "ti".

For example, the request relay part 114 sets the transmission destination of letter of introduction token "ti" to a server providing objective service, when the service that own server 1 provides cooperates with the objective service directly. In addition, when the service that own server 1 provides does not cooperate with the objective service directly, the request relay part 114 sets the transmission destination of the letter of introduction token "ti" to the provision server of the way service which cooperates with the service that own server 1 provides and until objective service.

Next, the letter of introduction token publication part 115 in the server 1 generates the letter of introduction token "ti" which is depicted in FIG. 7 (S28). The letter of introduction token publication part 115 generates the letter of introduction token "ti" having "own server" as a token publisher 41 of the letter of introduction, "transmission destination server" as introduction destination 42 of the letter of introduction token "ti", "role in the service that an own server provides" as role information 43 that the token publisher authorizes, and an "user ID" as the access main constituent 44. And the letter of introduction token publication part 115 adds the letter of introduction token "ti" to the address information which is revised according to the transmission destination server, and sends it to the server of transmission destination (S29).

In addition, the flow chart depicted in FIG. 9 is the processing that is common to all servers 1-3. In addition, as illustrated by FIG. 6, the server which does not have a certification function does not need to have process S21 and S22 of FIG. 9.

[Sequence in Embodiment]

Figure 10:
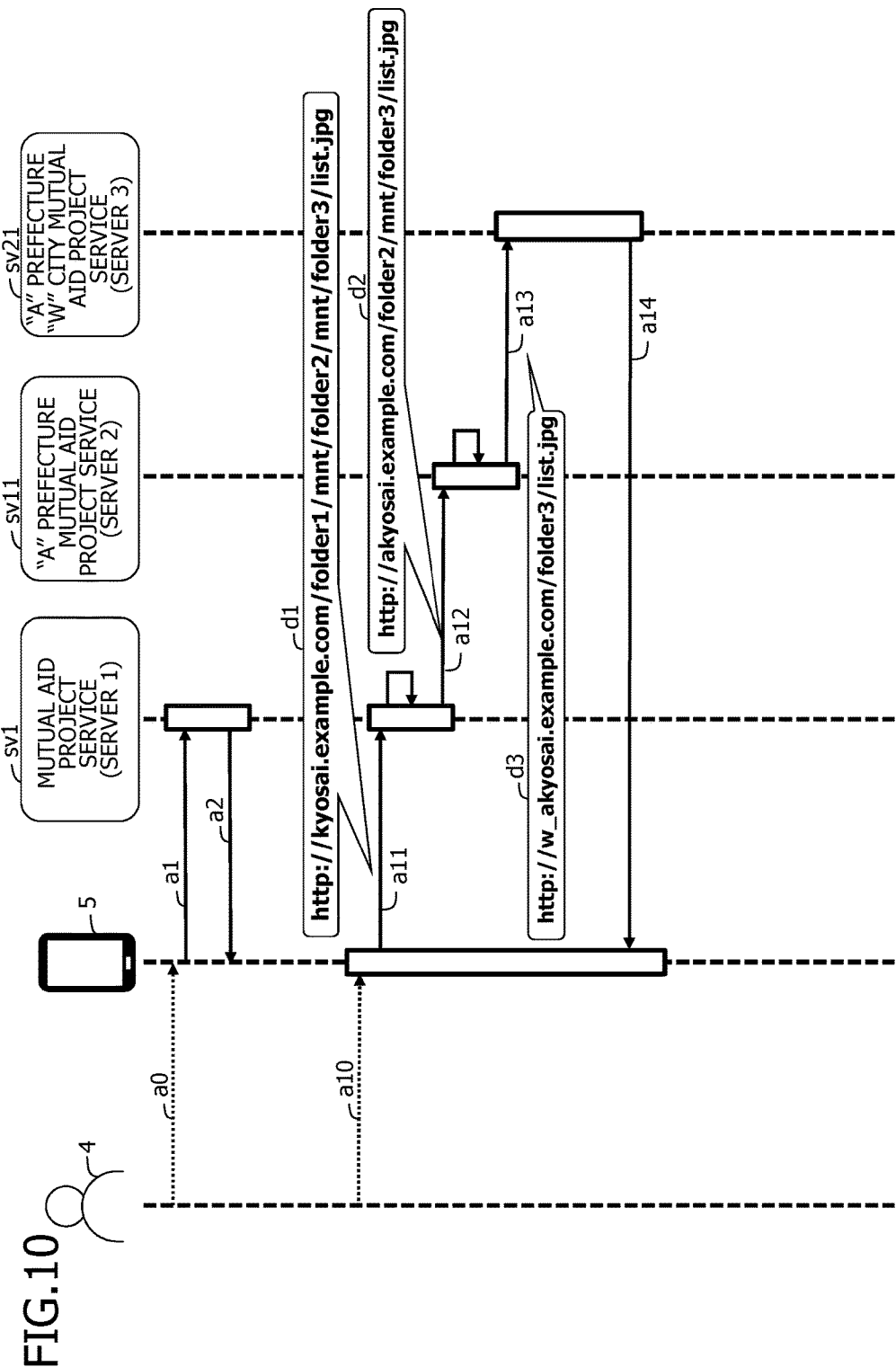
FIG. 10 is a diagram of sequence indicating an example of processing when using services which cooperate with many hierarchies according to the embodiment.

FIG. 10 is a diagram of sequence indicating an example of processing when using services which cooperate with many hierarchies according to the embodiment. The cooperation relations of each service depicted in FIG. 10 are similar to a diagram of sequence in FIG. 4. FIG. 10 illustrates, as same as FIG. 4, a diagram of sequence when the user 4 having an account information in the mutual aid project service "sv1" receives an provision of "A" prefecture "W" city mutual aid project service "sv21".

The user 4, as same as FIG. 4, performs login operation to log in to the mutual aid project service "sv1" (a0). For example, the user 4 inputs the account information including the user ID and the password into the terminal 5. The terminal 5 transmits the account information to the server 1 in response to the login operation by the user 4 (a1, S11 of FIG. 8).

The server 1 performs the user certification processing based on the account information sent by the terminal 5 (S21 of FIG. 9). When the server 1 authenticates that the user 4 is a fair user, the server 1 transmits the certification token tk1 including the role information indicating the role of the user 4 on the mutual aid project service sv1 to the terminal 5 (a2, S22 of FIG. 9). The terminal 5 acquires the published certification token tk1 from the mutual aid project service sv1. Here, a result of the certification processing may be displayed.

Next, the user 4 requires a provision of "A" prefecture "W" city mutual aid project service "sv1" (a10). The user 4 makes the terminal 5 to transmit the address information (URL: Uniform Resource Locator) d1 which points to the mutual aid project service "sv1" of the publication origin of certification token tk1 and identifies the "A" prefecture "W" city mutual aid project service "sv21" (objective service), to the server 1 (a10). The terminal 5 adds the published certification token tk1 to the URL "d1" from the mutual aid project service "sv1", and transmits it to the server 1.

In addition, here, the terminal 5 stored the URL "http://kyosai.example.com/folder1/mnt/fplder2/mnt/folder3/list.jpg" which is the address information d1 which identifies the "A" prefecture "W" city mutual aid project service "sv21" which is objective service beforehand. When the terminal 5 accesses the "A" prefecture "W" city mutual aid project service "sv21" first, for example, after logging in to the mutual aid project service sv1, the processing, which accesses to other server by tracing a link appointed by the operation of the user 4 among the link information to the other server which is acquired from the mutual aid project service "sv1", is carried out at once or several times. Thereby, the terminal 5 accesses the "A" prefecture "W" city mutual aid project service "sv21". The terminal 5 memorizes the address information of the server providing the service which is accessed at the time of the first access.

In addition, the example of FIG. 10 represents a case that the access destination is the folder in the server 1 and has the name "mnt" of the folder mounted by a folder of the server 2. In addition, the example of FIG. 10 represents a case that the access destination is the folder in the server 2 and has the name "mnt" of the folder mounted by a folder of the server 3.

In the URL "d1", the server 1 "kyosai.example.com" indicates the server 1 which provides the mutual aid project service "sv1". In addition, a part of the URL "d1" "http://kyosai.example.com/folder1/mnt/" indicates that the "folder2", which is a folder of the server 2 providing the "A" prefecture mutual aid project service "sv11", is mounted beneath the folder1 which is a directory of the server 1. In addition, a part of the URL "d1" "folder2/mnt/folder3/list.jpg" indicates that the "folder3", which is a folder of server 3 providing the "A" prefecture "W" city mutual aid project service "sv21", is mounted beneath the "folder2" which is the directory of the server 2. Therefore, the URL "d1" is the URL which indicates the server 1 and requests the access to the data " . . . /folder3/list.jpg" which stored in the data folder in the server 3. The servers 1-3 are able to identify a server (in this example server 3) providing the objective service based on the URL "d1".

In addition, it is possible that the servers 1-3 detect the cooperation relations between the services based on the mount information included in the URL "d1". That is, according to the URL "d1", it is possible to detect that the mutual aid project service "sv1" cooperates to the "A" prefecture mutual aid project service "sv11" and the "A" prefecture mutual aid project service "sv11" cooperates with the "A" prefecture "W" city mutual aid project service "sv21" based on the mount relations. In addition, in the embodiment, a case is exemplified that the data folder is mounted between the services to cooperate, but is not a thing limited to this example. It may not need that the data folder is mounted between the services to cooperate. The URL "d1" may indicate the address of the server that the letter of introduction token is transmitted, and identify a server providing the final objective service.

When the token analysis part 112 in the server 1 receives the token tk1 added the URL "d1" (YES of S23 in FIG. 9), the token analysis part 112 carries out the analysis processing of the token which is received (S24 of FIG. 9). In this case, the token analysis part 112 determines that the token is the certification token tk1. Then, the request analysis part 113 in the server 1 identifies the provision server (the server 3 providing the "A" prefecture "W" city mutual aid project service sv21 in this example) of the objective service requested by the terminal 5 based on the URL "d1". In this case, because the own server 1 is different from the provision server 3 of the service (NO of S25 of FIG. 9), the request relay part 114 in the server 1 decides a server of transmission destination of the letter of introduction token "ti" to the provision server 2 of the "A" prefecture mutual aid project service sv11 based on higher mount point "folder1/mnt/" in the URL "d1" (S27 of FIG. 9).

And, the letter of introduction token publication part 115 in the server 1 generates the letter of introduction token "ti" which has "server 1" as the token publisher 41, "server 2" as the introduction destination 42 of the letter of introduction token, "a role on mutual aid project service sv1" as the role information 43 that the token publisher authorizes, and "user ID" as the access main constituent 44. In addition, the letter of introduction token publication part 115 generates the URL "http://akyosai.example.com/folder2/mnt/folder3/list.jpg" d2 corresponding to the server 2, based on the URL "http://kyosai.example.com/folder1/mnt/folder2/mnt/folder3/list.jpg" d1 which has been received. In other words, the letter of introduction token publication part 115 generates a URL (address information) which identifies the provision server of the objective service and indicates the transmission destination of the letter of introduction token "ti". And the server 1 adds the letter of introduction token "ti" to the generated URL and transmits it to the server 2 (a12, S29 of FIG. 9).

Then, when the token analysis part 112 in the server 2 receives the token which is added the URL "http://akyosai.example.com/folder2/mnt/folder3/list.jpg" d2 (YES of S23 of FIG. 9), the token analysis part 112 carries out the analysis processing of the token which is received (S24 of FIG. 9). The token analysis part 112 determines that the token which is received is the letter of introduction token "ti". In addition, the token analysis part 112 acquires a role on the "A" prefecture mutual aid project service "sv11" corresponding to "the role on the mutual aid project service sv1" which is the role information 43 that the token publisher in the letter of introduction token "ti" authorizes.

Then, the request analysis part 113 in the server 2 identifies the provision server (in this example server 3) of the service requested by the terminal 5 based on the URL "d2". In this case, because the own server 2 is different from the provision server 3 of the service (NO of S25 of FIG. 9), the request relay part 114 in the server 2 decides a server of transmission destination of letter of introduction token "ti" to the server 3 providing the "A" prefecture "W" city mutual aid project service "sv21", based on higher mount point "folder2/mnt/folder3/list.jpg" in the URL "d2" (S27 of FIG. 9).

And, the letter of introduction token publication part 115 in the server 2 generates the letter of introduction token "ti" which has "server 2" as the token publisher 41 of the letter of introduction token, "server 3" as the introduction destination 42 of the letter of introduction token, "a role on the "A" prefecture mutual aid project service sv11" as the role information 43 that the token publisher authorizes, and "user ID" as the access main constituent 44. In addition, the letter of introduction token publication part 115 generates the URL "http://w_akyosai.example.com/folder3/list.jpg" d3 corresponding to the server 3, based on the URL "http://akyosai.example.com/folder2/mnt/folder3/list.jpg" d2 which has been received. In other words, the letter of introduction token publication part 115 generates a URL (address information) which identifies the provision server of the objective service and indicates the transmission destination of the letter of introduction token "ti". And the server 2 adds the letter of introduction token "ti" to the generated URL "d3" and transmits it to the server 3 (a13, S29 of FIG. 9).

And when the token analysis part 112 in the server 3 receives the token which is added the URL "http://w_akyosai.example.com/folder3/list.jpg" d3 (YES of S23 of FIG. 9), the token analysis part 112 carries out the analysis processing of the token which is received (S24 of FIG. 9). The token analysis part 112 determines that the token which is received is the letter of introduction token "ti". In addition, the token analysis part 112 acquires a role on the "A" prefecture "W" city mutual aid project service sv21 corresponding to the role information 43 "a role on "A" prefecture mutual aid project service sv11" that the token publisher authorizes in the letter of introduction token "ti".

Next, the request analysis part 113 in the server 3 identifies the provision server (in this example server 3) of the service requested by the terminal 5 based on the URL. In this case, because the own server 3 corresponds to the provision server of the service (YES of S25 of FIG. 9), the server 3 accesses to the data which is appointed by the URL d3 ( . . . /folder3/list.jpg) (S26 of FIG. 9) and enables provide the data to the terminal 5 within the role on the "A" prefecture "W" city mutual aid project service "sv21". For example, when the access to the data ( . . . /folder3/list.jpg) is permitted based on a role on the "A" prefecture "W" city mutual aid project service "sv21", the server 3 transmits the data ( . . . /folder3/list.jpg) to the terminal 5.

In addition, in the example of FIG. 10, the server 3 transmits requested data to the terminal 5 directly, but it is not a thing limited to this example. The server 3 may transmit the data ( . . . /folder3/list.jpg) to the terminal 5 around the servers 1, 2 that the letter of introduction token "ti" was relayed, or may transmit the data to the terminal 5 around only server 1 which performs the certification processing.

In addition, in this example, the terminal 5 adds the certification token tk1 published from the mutual aid project service sv1 to the address information and transmits it to the server 1 providing the mutual aid project service "sv1". However, the terminal 5 may directly transmit the address information and the certification token tk1 to the server 2 which provides the "A" prefecture mutual aid project service "sv11" in connection with the mutual aid project service "sv1", not to the mutual aid project service "sv1". In this case, the processing of the server 2 is similar to the processing which is explained in FIG. 10.

In this way, it is possible that the terminal 5 gets the provision of the "A" prefecture "W" city mutual aid project service "sv21" based on the certification token tk1 of the mutual aid project service "sv1". The servers 1-3 in the embodiment, when an own server is not the provision server of the objective service identified based on address information, relays the letter of introduction token "ti" to the provision server of the service or the way server to the provision server. Thereby, the communication number of times between the terminal 5 and each server 1-3 reduces, because the terminal 5 does not need to receive the publication of certification token tk1 of the service except the mutual aid project service "sv1", one by one. Generally, the Internet line is a higher transmission rate than a wireless line. Therefore, it become able to shorten time needed until the user 4 receives the provision of the service.

As represented by FIG. 10, according to the service provision method in the embodiment, the communication number of times with the terminal 5 and the server is held down in two times (a11, a14), namely one round trip. In other words, the number of times of the communication using the wireless line that the transmission rate is slower than the Internet line which communicates between the servers is controlled to one round trip. On the other hand, as mentioned by FIG. 4, according to the conventional service provision method, the communication number of times with the terminal 5 and the server is six times (a3-a8). In addition, in the example of FIG. 4 and FIG. 10, a case that the cooperation relations of the service is three hierarchies, according to the embodiment, even if the cooperation relations increased to several hierarchies, the communication number of times with the terminal 5 and the server is held down to two times, namely one round trip. Therefore, the communication number of times with the terminal 5 and the server is reduced more effectively so that a hierarchy is deeper, and a response until the user 4 receives the provision of the service is improved.

A different effect according to the service provision method in the embodiment will be described.

Figure 11:
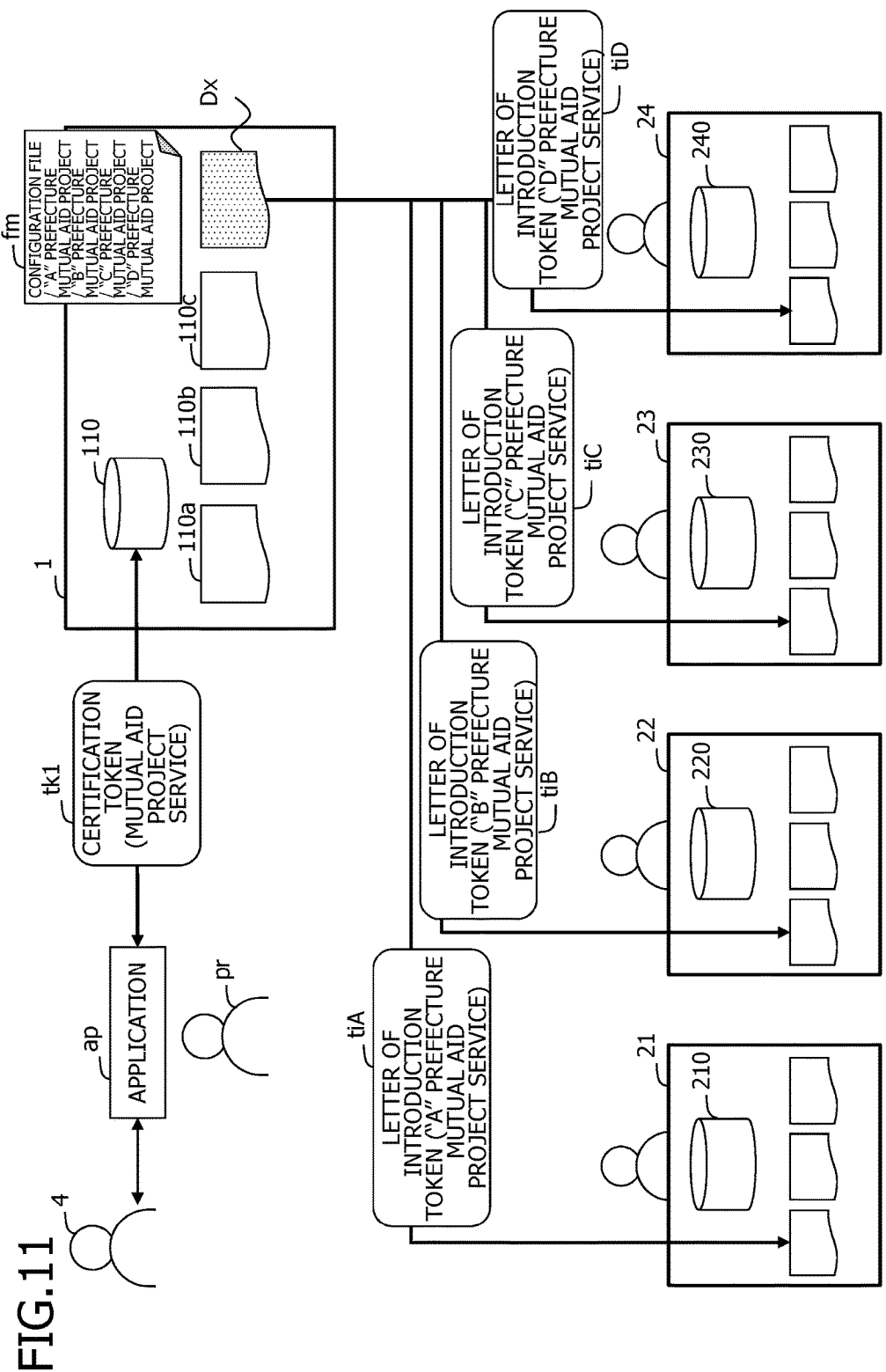
FIG. 11 is a diagram explaining the different effect by the service provision method in the embodiment.

FIG. 11 is a diagram explaining the different effect by the service provision method in the embodiment. In the example of FIG. 11, the mutual aid project service cooperates with the mutual aid project services of the "A" prefecture—"D" prefecture. In addition, according to the example of FIG. 11, the server 1 providing the mutual aid project service has a data folder 110 storing application data 110a-110c of the user 4. The terminal 5 is able to access the data folder 110 in the server 1 based on the certification token tk1 of the mutual aid project service.

In addition, in an example of FIG. 11, the data folder 110 has relay directory Dx which mounts the data folders 210-240 in the provision servers 21-24 of the "A" prefecture—"D" prefecture mutual aid project services in connection with the mutual aid project service. The server 1 manages the mount information in the relay directory Dx based on configuration file "fm" which is illustrated.

According to the service provision method in the embodiment, the terminal 5 adds the certification token tk1 of the mutual aid project service to the address information which appoint data in the data folder 230 of the provision server 23 of the "C" prefecture mutual aid project service and sends it to the server 1. Thereby, it is possible that the terminal 5 gets the provision of the "C" prefecture mutual aid project service within the role. In this case the letter of introduction token "tiC" is published to the provision server 23 of the "C" prefecture mutual aid project service from the provision server 1 of the mutual aid project service. It is possible that the terminal 5 accesses the data folder 230 of the server 23 beneath the relay directory Dx, based on the letter of introduction token "tiC".

As illustrated in FIG. 11, even if the user 4 receives the provision of either one of the mutual aid project services of the "A" prefecture—"D" prefecture, the token transmitted and received between the terminal 5 and the server 1 is only certification token tk1 of the mutual aid project service. Therefore, the terminal 5 is only needed to manage the certification token tk1 of the mutual aid project service. This matter represents that the terminal 5 does not need to consider each of certification tokens, that the "A" prefecture—"D" prefecture mutual aid project services publish, on application ap working on the terminal 5. In other words, the developer pr of application ap working on the terminal 5 should develop the application ap only being conscious of the certification token tk1 that the mutual aid project service publishes. Therefore, it is possible to control a development man-hour of application ap. In addition, for example, even if the mutual aid project service cooperates with newly different service, it does not need to treat the certification token of the new service. Therefore, a change of application ap working on the terminal 5 becomes needless.

Further effect by the service provision method in the embodiment will be described successively.

Figure 12:
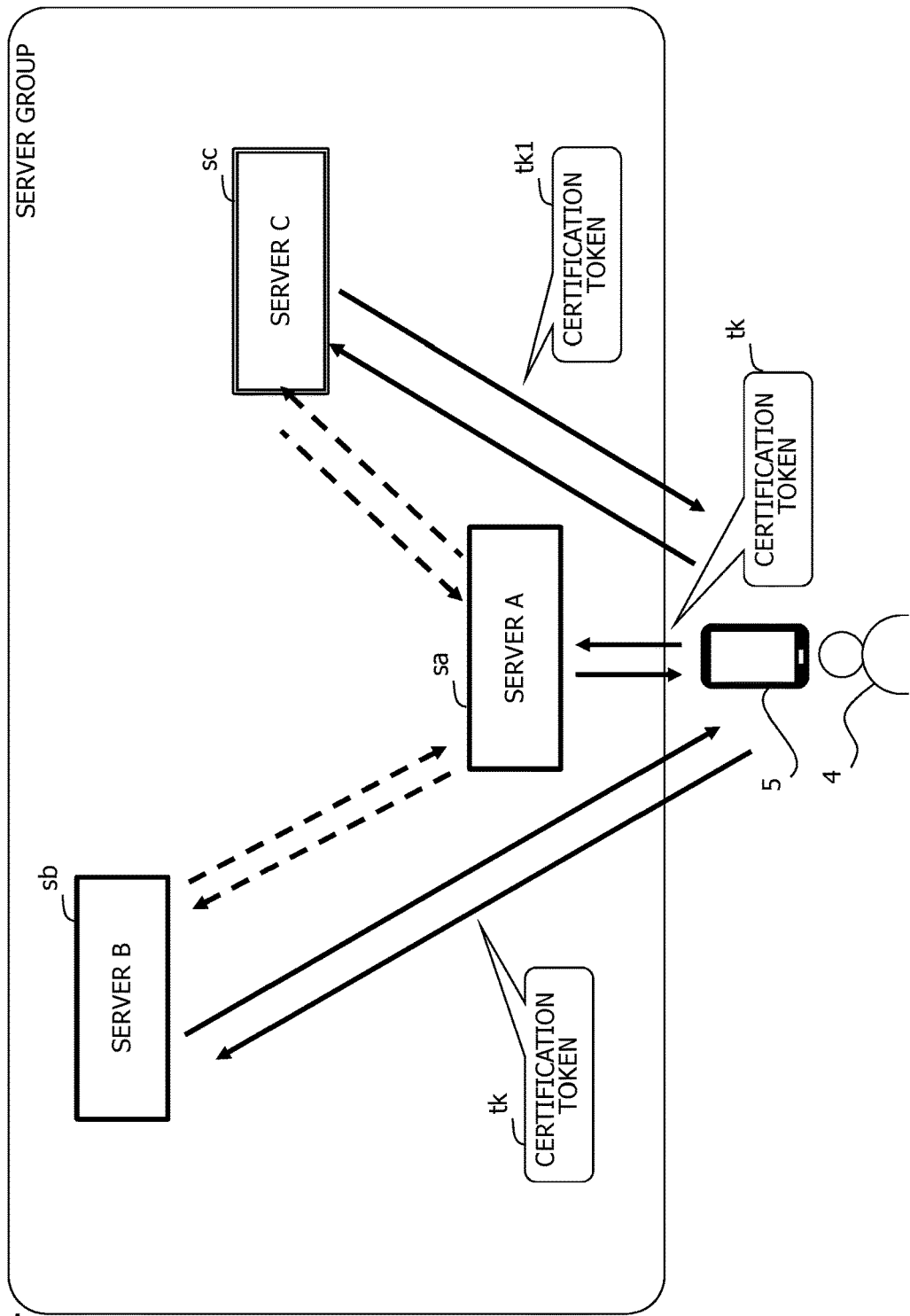

FIG. 12 is a diagram indicating the propagation example of the certification token when adopting Single Sign-On. When adopting the Single Sign-On, the certification token of user 4 which is published by the service "A" provided by the server Asa is propagated for other server Bsb, server Csc as depicted with an arrow of the solid line. However, this means to transmit the certification token tk1 to a malicious server Csc. Therefore, there is a possibility to occur an injustice access to the server Asa and to deliver the certification token tk1 to a different malicious server by giving an authority for the service "A" in malicious server Csc. Therefore, the certification by the Single Sign-On is applicable only to the trustworthy servers group such as the environment in the company.

Figure 13:
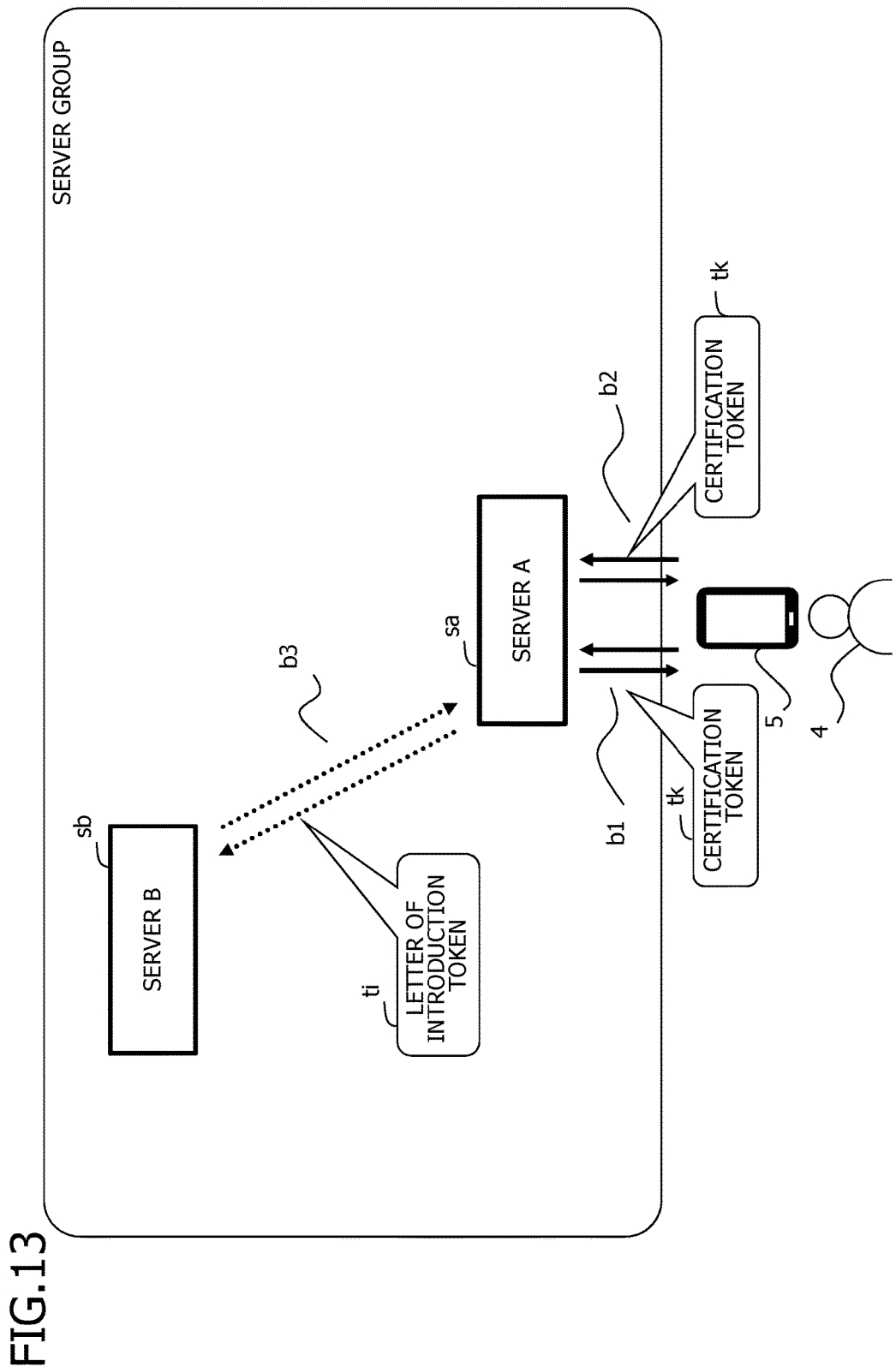
FIG. 13 is a diagram explaining a propagation example of certification token "tk" in the embodiment.

FIG. 13 is a diagram explaining a propagation example of certification token "tk" in the embodiment. As depicted in FIG. 13, in the embodiment, the user 4 receives the publication of certification token "tk" from the service "A" (b1). And when the user 4 demands an provision of different service "B" to the service "A" based on the certification token "tk" (b2), the server Asa does not transmit the certification token "tk" to the server Bsb but sends the letter of introduction token "ti" to the server Bsb (b3). The server Bsb where the letter of introduction token "ti" was transmitted provides the service to the user 4 (b3), only when the provision server of the requested service is an own server. Therefore, it is not possible that the server Bsb accesses to the server Asa illegally based on the letter of introduction token "ti" when the server Bsb is a malicious server.

As illustrated in FIG. 13, according to the service provision method in the embodiment, only server Asa which published the certification token "tk" holds the certification token "tk", and the letter of introduction token "ti" is published in the provision server Bsb of service "B" cooperating with the service "A". Therefore, it is avoided to transmit the certification token "tk" of the server Asa to a malicious server. Accordingly, the service provision method in the embodiment becomes able to apply to opener environment in comparison with the Single Sign-On.

As described above, according to the service provision method in the embodiment, a first information processing device (server 1) sends a certification token "tk" including the first role information in the service that the first information processing device provides to the terminal 5 when the certification is successful in response to a certification demand from the terminal 5. In addition, the first information processing device receives the certification token "tk" and the first address information which identifies a service providing device providing the service requested by the terminal and appoints the first information processing device. In addition, the first information processing device transmits the first token (letter of introduction token) including the first role information and the second address information which identifies the service providing device and appoints the second information processing device to the second information processing device (server 2) indicating one of the service providing device identified based on the first address information or the way devices to the service providing device.

According to the service provision method in the embodiment, the server 1 relays the letter of introduction token "ti" for the provision server of the objective service or the way server to the provision server. In other words, the server 1 identifies the provision server of the service that the terminal 5 requests based on the address information, and relays the letter of introduction token "ti" having the certification information of the user to the provision server of the service without going through the terminal 5. Because it does not needed that the terminal 5 receives the publication of certification token tk1 from the server except the certification server one by one, the communication number of times between the terminal 5 and each server is reduced. In other words, according to the service provision method in the embodiment, communication number of times between the terminal 5 and the server 1-3 are held in two times, namely one round trip. In addition, each server to cooperate is connected on a higher-speed line in comparison with the transmission rate between terminal 5 and the server. Therefore, it is possible to shorten the time needed until a user receives the provision of the service by relaying a letter of introduction token and reducing the communication with the terminal 5.

In addition, because the communication number of times between the terminal 5 and the server 1-3 are minimized, the communication number of times with terminal 5 and the server is reduced more effectively when a hierarchy is deeper, thereby a response until the user receives the provision of the service is improved.

In addition, according to the service provision method in the embodiment as illustrated by FIG. 11, the token transmitted and received between the terminal 5 and the certification server is only the certification token that a certification server publishes, even if a user receives the provision of either service which cooperate with the provision service of the certification server. Therefore, it is possible to hold down a development man-hour of the application because the developer of the application working on the terminal 5 should develop the application only being conscious of the certification token which the certification server publishes.

In addition, as illustrated in FIG. 13, according to the service provision method in the embodiment, only server which published the certification token holds the certification token, and the letter of introduction token is published in the provision server of service cooperating with the service. Therefore, it is avoided to transmit the certification token of the server to a malicious server. Accordingly, the service provision method in the embodiment becomes able to apply to opener environment.

In addition, according to the service provision method in the embodiment, the second information processing device (server 2) receives the first token (letter of introduction token) and the second address information from the first information processing device (server 1), and the second information processing device provides service corresponding to the second address information to the terminal 5 based on the first role information included in the first token (letter of introduction token) when a service providing device identified based on the second address information is an own device.

Thereby it is possible that the server 2 provides the service based on relayed letter of introduction token "ti". Therefore, the communication number of times between the terminal 5 and each server is reduced, thereby it is possible to shorten the time needed until the user receives the provision of the service.

In addition, according to the service provision method in the embodiment, the second information processing device (server 2) receives the first token (letter of introduction token) and the second address information from the first information processing device (server 1). And the second information processing device, when the service providing device identified based on the second address information is not an own device, transmits the second token (letter of introduction token) including the second role information, which is a role information of the service that the second information processing device provides and corresponds to the first role information, and the third address information, which identifies the service providing device and indicates the third information processing device, to the third information processing device indicating one of service providing device or the way devices to the service providing device.

Thereby, according to the service provision method in the embodiment, it is possible that the server 2 identifies the provision server of the service that terminal 5 requests based on the address information, and relays the letter of introduction token "ti" having the certification information of the user to the provision server of the service.

In addition, according to the service provision method in the embodiment, the first information processing device (server 1) provides the service corresponding to the first address information to the terminal 5 based on the first role information included in the first token (letter of introduction token) when a service providing device identified based on the first address information is an own device. Thereby, it is possible that the server 1 provides service based on the certification token "tk1".

In addition, according to the service provision method in the embodiment, the second information processing device (server 2) receives the first token (letter of introduction token) including the first role information in the service that the first information processing device provides from the first information processing device (server 1) and the second address information which identifies a service providing device providing the service that the terminal 5 requests and indicates the second information processing device. In addition, the second information processing device provides service corresponding to the second address information to the terminal 5 based on the first role information included in the first token (letter of introduction token) when a service providing device identified based on the second address information is an own device.

Thereby, it is possible that the server 2 provides service based on relayed letter of introduction token "ti". Accordingly, the communication number of times between the terminal 5 and each server is reduced, thereby it is possible to shorten the time needed until a user receives the provision of the service.

In addition, according to the service provision method in the embodiment, the second information processing device (server 2), when the service providing device identified based on the second address information is not an own device, transmits the second token (letter of introduction token) including the second role information, which is a role information of the service that the second information processing device provides and corresponds to the first role information, and the third address information, which identifies the service providing device and indicates the third information processing device, to the third information processing device (server 3) indicating one of service providing device or the way devices to the service providing device.

Thereby, it is possible that the server 2 identifies the provision server of the service that terminal 5 requests based on the address information, and relays the letter of introduction token "ti" having the certification information of the user to the provision server of the service.

In addition, according to the service provision method in the embodiment, the transmission rate with the first information processing device (server 1) and the second information processing device (server 1) is faster than the transmission rate with the terminal 5 and the second information processing device. In addition, the transmission rate with the second information processing device and the third information processing device is faster than the transmission rate with the terminal 5 and the third information processing device (server 3). Thereby, it is possible to shorten the time needed until a user receives the provision of the service, because the communication between the terminal 5 and the server is reduced by the service provision method in the embodiment.

In addition, according to the service provision method in the embodiment, the way device to a service providing device identified based on the first address information is able to be identified based on address information, and the first information processing device identifies the way device based on the first address information. Thereby, according to the service provision method in the embodiment, it is possible to relay the letter of introduction token "ti" having the certification information of the user to the provision server of the service.

In addition, according to the service provision method in the embodiment, the first information processing device has a table maintaining the information of the way device between the own device and address information processing device, and the first information processing device identifies the way device based on the table. Thereby, according to the service provision method in the embodiment, it is possible to relay the letter of introduction token "ti" having the certification information of the user to the provision server of the service.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A service providing method, the method comprising:

transmitting, by a first information processing device, a certification token including first role information on a first service provided by the first information processing device to a terminal device when a certification is successful in response to a certification demand from the terminal device;

receiving, by the first information processing device, the certification token and first address information, that identifies a service providing device which provides a requested service requested by the terminal and indicates the first information processing device, from the terminal device;

transmitting, by the first information processing device, a first token including the first role information indicated by the certification token which is received and second address information, that identifies the service providing device and indicates a second information processing device, to the second information processing device which is either one of the service providing device or a way device to the service providing device that is identified based on the first address information; and transmitting, by the second information processing device, a second token including second role information on a second service that the second information processing device provides and corresponds to the first role information, and third address information, that identifies the service providing device and indicates a third information processing device, to the third information processing device which is either one of the service providing device or a way device to the service providing device.

2. The service providing method according to claim 1, wherein the method further comprising:

receiving, by the second information processing device, the first token and the second address information from the first information processing device; and providing, by the second information processing device, the service corresponding to the second address information to the terminal device based on the first role information included in the first token when the service providing device that is identified based on the second address information is an own device.

3. The service providing method according to claim 1, further comprising receiving, by the second information processing device, the first token and the second address information from the first information processing device.

4. The service providing method according to claim 1, wherein the method further comprising: providing, by the first information processing device, the service corresponding to the first address information to the terminal device based on the first role information included in the first token when the service providing device that is identified based on the first address information is an own device.

5. The service providing method according to claim 1, wherein a transmission rate between the first information processing device and the second information processing device is faster than a transmission rate between the terminal device and the second information processing device.

6. The service providing method according to claim 5, wherein a transmission rate between the second information processing device and the third information processing device is faster than a transmission rate between the terminal device and the third information processing device.

7. The service providing method according to claim 1, wherein the way device to the service providing device is identifiable based on the first address information, and
wherein the first information processing device identifies the way device based on the first address information.

8. The service providing method according to claim 1, wherein the first information processing device further comprises a table that maintains information of the way device between an own device and a destination information processing device, and identifies the way device based on the table.

9. The service providing method according to claim 1, wherein the first token is information for causing the service providing device to provide the service corresponding to the first role information to the terminal device.

10. A service providing method, the method comprising:
receiving, by a first information processing device, a first token including first role information of a first service that a first second information processing device provides and second address information, that identifies a service providing device that provides a requested service requested by a terminal device and indicates the first information processing device, from the first second information processing device;
providing, by the first information processing device, the requested service corresponding to the second address information to the terminal device based on the first role information included in the first token when the service providing device that is identified based on the second address information is an own device, and
transmitting, by the first information processing device, a second token including second role information on a second service that the first information processing device provides and corresponds to the first role information, and third address information, that identifies the service providing device and indicates a third information processing device, to the third information processing device which is either one of the service providing device or a way device to the service providing device.

11. The service providing method according to claim 10, wherein the first token is information for causing a service providing device which provides a service requested by the terminal to provide the service corresponding to the first role information to the terminal device.

12. A service providing device, comprising:
a memory; and
a processor that transmits a certification token including first role information on a first service provided by the service providing device to a terminal device when a certification is successful in response to a certification demand from the terminal device, receives the certification token and first address information, that identifies another service providing device which provides a requested service requested by the terminal device and indicates the service providing device, from the terminal device, transmits a first token including the first role information and second address information, that identifies the other service providing device and indicates an information processing device, to the information processing device which is either one of the other service providing device or a way device to the other service providing device that is identified based on the first address information, and transmits a second token including second role information on a second service that the information processing device provides and corresponds to the first role information, and third address information, that identifies the other service providing device and indicates another information processing device, to the other information processing device which is either one of the other service providing device or a way device to the other service providing device.

13. A service providing device, comprising:
a memory; and
a processor that receives a first token including first role information of a first service that an information processing device provides and second address information, that identifies another service providing device that provides a requested service requested by a terminal device and indicates the service providing device, provides a second service corresponding to the second address information to the terminal device based on the first role information included in the first token when the other service providing device that is identified based on the second address information is the service providing device, and transmits a second token including second role information on a third service that the other service providing device provides and corresponds to the first role information, and third address information, that identifies the other service providing device and indicates another information processing device, to the other information processing device which is either one of the other service providing device or a way device to the other service providing device.

* * * * *